United States Patent Office 3,091,481
Patented May 28, 1963

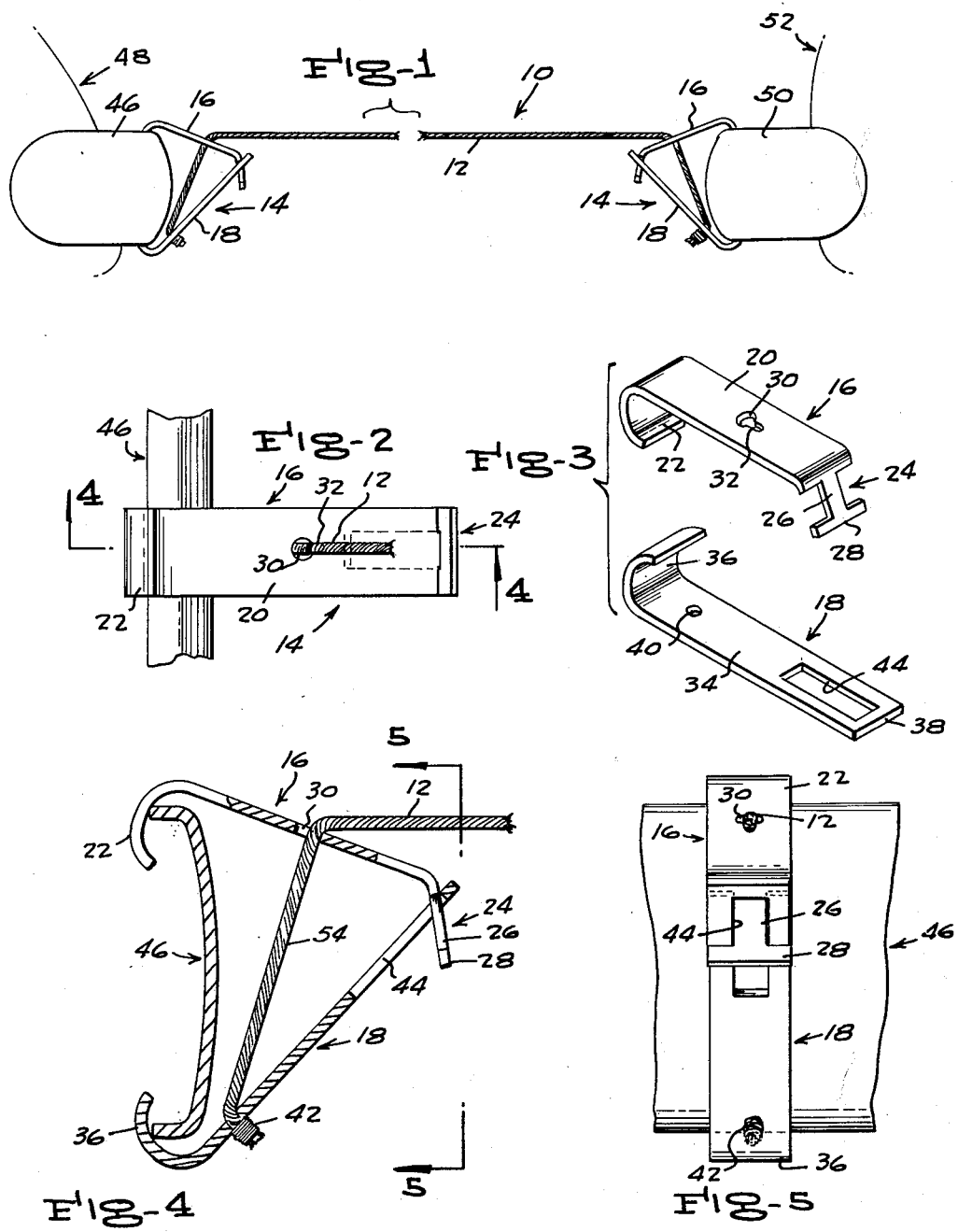

3,091,481
TOWING CABLE ASSEMBLY
William M. Fearn, Box 203, Kodiak, Alaska
Filed Sept. 29, 1961, Ser. No. 141,660
3 Claims. (Cl. 280—480)

This invention relates to a novel towing cable assembly for connection to the rear bumper bar of a tow car and the front bumper bar of a car being towed.

The primary object of the invention is the provision of a towing cable assembly of the kind indicated which has generally improved and more efficient clamps which are more easily and quickly applied to and removed from bumper bars.

Another object of the invention is the provision of simpler clamps of the character indicated above, which consist of only two parts which are interengaged so as to serve as clamping jaws having hooks engageable over the upper and lower edges of bumper bars, the jaws being adjustable relative to each other to fit bumper bars of different widths, and being clampable on bumper bars by the pull of the cable.

A further object of the invention is the provision of clamps of the character indicated above wherein the cable passes through an opening in one of the jaws and is secured to the other jaw, the opening in said one jaw being provided with a cable clamping slot for holding taut the part of the cable extending between the jaws, so as to preclude loosening of the jaws from bumper bars when the cable is slack.

Other important objects and advantageous features of the invention will be apparent from the following description and the accompanying drawings, wherein, for purposes of illustration only, a specific form of the invention is set forth in detail.

In the drawings:

FIGURE 1 is a contracted schematic side elevation showing a towing cable of the present invention extending between and connected to the rear bumper bar of a towing vehicle and the front bumper bar of a vehicle being towed;

FIGURE 2 is an enlarged fragmentary top plan view of FIGURE 1;

FIGURE 3 is an exploded perspective view of a clamp;

FIGURE 4 is a vertical longitudinal section taken on the line 4—4 of FIGURE 2; and FIGURE 5 is a vertical transverse section taken on the line 5—5 of FIGURE 4.

Referring in detail to the drawings, wherein like numerals designate like parts throughout the several views, the illustrated device, generally designated 10, comprising a preferably metal towing cable 12, and similar but reversed clamps 14 secured on opposite ends of the cable.

Each clamp 14 comprises an upper jaw 16 and a lower jaw 18, the jaws being made of flat rigid metal stock. The upper jaw 16 comprises an elongated flat straight main bar portion 20 having a downwardly and inwardly curved hook 22 on one end, and a downwardly and outwardly angled flat T-shaped arm 24 on its other end. The arm 24 is preferably disposed at an angle of about 45° relative to the bar portion 20, and comprises a stem 26, which is substantially narrower than the main portion 20 and is centered relative thereto, and a cross head 28 centered on the lower end of the stem 26 and extending beyond opposite sides of the stem and spaced from the adjacent end of the main portion. At its midlength point the main bar portion 20 is formed with a centered circular opening 30, large enough to freely pass the cable 12. At the side of the opening 30 adjacent to the arm 24, a cable clamping slot 32 is provided, in the main portion 20, which opens to the opening 30. The slot 32 is only wide enough to admit the cable 12 when forcibly engaged therein, so that the cable is then prevented from moving in either direction relative to the upper jaw 16.

The lower clamp jaw 18 is slightly longer than the upper jaw 16 and comprises a flat straight main bar portion 34 which has an upwardly and inwardly curved hook 36 on one end thereof, and has a free and unencumbered other end 38. The main bar portion 34 is provided, near the hook 36, with a hole 40 through which an end of the cable 12 is adapted to be passed and secured, as by means of a flair or wrapping 42, of enlarged diameter, which bears against the underside of the main portion 34.

The main bar portion 34 is further formed with a centered, longitudinally elongated closed slot 44, which is located near to and spaced from the end 38 of the main portion, and narrower than the cross head 28 of the upper jaw arm 24. The slot 44 is long enough to provide for substantial amplitude of adjustability of the jaws 16 and 18, relative to each other to accommodate bumper bars of different widths, such as the rear bumper bar 46 of a towing vehicle 48 and the front bumper bar 50 of a towed vehicle 52.

The clamps 14 are assembled by passing the cross head 28 of the arm of the upper jaw 16 lengthwise down through the lower jaw slot 44 and then aligning the upper and lower jaws so that the cross head 28 bridges the slot 44. As shown in FIGURE 4, the hook of the upper jaw 16 is then engaged over the upper edge of a bumper bar, the hook 36 of the lower jaw 18 is engaged around the lower edge of the bumper bar, whereat the cable 12 is pulled upwardly through the opening of the upper jaw 16, until the hooks 22 and 36 are forcibly engaged with the bumper bar edges, whereat the cable is forced into the cable clamping slot 32 of the upper jaw 16. This keeps the part 54 of the cable 12, between the jaws, in a taut condition, so that when slack develops in the cable, the jaws are prevented from moving relative to each other and losing their grips on the bumper bar.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A towing cable assembly for establishing connection between a towing vehicle and a towed vehicle, each of the vehicles including a connection element having upper and lower edges, the assembly comprising:
   (a) a cable having opposite ends;
   (b) a pair of clamps engaged with the cable at the ends thereof and with the respective connection elements of the vehicles;
   (c) each of the clamps comprising an upper jaw having a main portion;
   (d) means adjacent one end of the main portion engaged with the upper edge of the adjacent connection element;
   (e) releasable catch means adjacent the other end of the main portion;
   (f) cable clamping means intermediate the ends of the main portion restricting movement of the cable;
   (g) a lower jaw comprising a main portion with means on one of its ends engaging the lower edge of the connection element;
   (h) the main portion of the lower jaw being formed with means interengageable with the releasable catch means of the upper jaw whereby the jaws are secured to one another; and (i) cable end securing means on the main portion of the lower jaw, the cable extending from the last named means to its engagement with the cable clamping means of the upper jaw whereby the jaws are maintained in clamping engagement with the respective connection elements of the vehicles.

2. A towing cable assembly for establishing connection between a towing vehicle and a towed vehicle, each of vehicles including a bumper having upper and lower edges, the assembly comprising:

(a) a cable having opposite ends;
(b) a pair of clamps engaged with the cable at the ends thereof and with the respective connection elements of the vehicles;
(c) each of the clamps comprising an upper jaw having a main portion;
(d) a downturned hook on one end of the main portion engageable with the upper edge of one of said bumpers;
(e) the main portion being formed intermediate its ends with an opening of a size such that the cable is freely slidable therethrough and a cable clamping slot communicating with the opening of a size restrictive to sliding of the cable;
(f) the lower jaw, including an under side, comprising a main portion having an upturned hook on one end thereof engaging the lower edge of the bumper;
(g) the main portion of the lower jaw being formed with a closed longitudinal slot adjacent to its other end;
(h) the main portion of the upper jaw having a T-shaped arm adjacent to its other end;
(i) the T-shaped arm of the upper jaw comprising a stem narrower than the slot of the lower jaw and a crosshead on the stem wider than the lower jaw slot, the stem extending through the lower jaw slot with the crosshead engaged with the under side of the lower jaw; and
(j) cable end securing means on the main portion of the lower jaw, said cable extending from said last-named means through said clamping slot in the upper jaw whereby the upper and lower jaws are secured in clamping engagement with the bumper.

3. The invention of claim 2, wherein:
(a) the main portions of the upper and lower jaws are straight and flat.

References Cited in the file of this patent
UNITED STATES PATENTS

| | | |
|---|---|---|
| 2,494,526 | Tungett et al. | Jan. 10, 1950 |
| 2,659,609 | Johnson | Nov. 17, 1953 |
| 2,708,121 | May | May 10, 1955 |